United States Patent
Torres Martinez

(10) Patent No.: US 6,759,758 B2
(45) Date of Patent: Jul. 6, 2004

(54) WIND TURBINES FOR ELECTRICAL POWER GENERATION

(76) Inventor: Manuel Torres Martinez, Sancho El Fuerte, 21, 31007 Pamplona (ES)

( * ) Notice: Subject to any disclaimer, the term of this patent is extended or adjusted under 35 U.S.C. 154(b) by 89 days.

(21) Appl. No.: 10/445,432

(22) Filed: May 26, 2003

(65) Prior Publication Data

US 2003/0230899 A1 Dec. 18, 2003

(30) Foreign Application Priority Data

Jun. 13, 2002 (ES) .......................................... 200201362

(51) Int. Cl.$^7$ .............................. F03D 1/00; F03D 11/02
(52) U.S. Cl. .............................. 290/55; 290/54; 290/44; 290/43; 290/7; 416/31
(58) Field of Search ............................. 290/55, 54, 44, 290/43, 7; 416/31

(56) References Cited

U.S. PATENT DOCUMENTS

| | | | | |
|---|---|---|---|---|
| 2,177,801 A | * | 10/1939 | Erren ........................... | 290/55 |
| 4,527,072 A | * | 7/1985 | van Degeer ................. | 290/55 |
| 4,966,525 A | * | 10/1990 | Nielsen ......................... | 416/9 |
| 5,035,575 A | * | 7/1991 | Nielsen et al. ................. | 416/9 |
| 5,506,453 A | * | 4/1996 | McCombs .................... | 290/44 |
| 6,232,673 B1 | * | 5/2001 | Schoo et al. .................. | 290/55 |
| 6,465,901 B2 | * | 10/2002 | Croes ............................ | 290/55 |
| 6,608,397 B2 | * | 8/2003 | Makino et al. ............... | 290/44 |
| 2002/0153729 A1 | * | 10/2002 | Beauchamp et al. .......... | 290/55 |
| 2003/0015877 A1 | * | 1/2003 | Schlemenat .................. | 290/55 |
| 2003/0071469 A1 | * | 4/2003 | Becker ......................... | 290/55 |
| 2003/0080566 A1 | * | 5/2003 | Becker et al. ................. | 290/55 |
| 2003/0102677 A1 | * | 6/2003 | Becker et al. ................. | 290/55 |

FOREIGN PATENT DOCUMENTS

| | | | | |
|---|---|---|---|---|
| DE | 0811764 | * | 10/1997 | ............ F03D/1/00 |
| EP | 821161 | * | 1/1998 | ............ F03D/1/00 |
| EP | 01 201 624.2 | | 6/2001 | |
| EP | 1251268 | * | 10/2002 | ........... F03D/11/02 |
| EP | 1 819 830 A1 | | 6/2003 | |
| EP | 03 290 700.8 | | 6/2003 | |
| ES | 2140301 | * | 5/1997 | ............ F03D/1/00 |
| ES | 2185504 | * | 3/2001 | ........... F03D/11/04 |
| ES | 2156706 | * | 7/2001 | ............ F03D/1/00 |
| ES | 2157836 | * | 8/2001 | ............ F03D/1/00 |
| ES | 2156706 | | 1/2002 | |
| ES | 200201362 | | 6/2002 | |
| ES | 200300747 | | 3/2003 | |
| ES | 2185504 | | 4/2003 | |
| JP | 03241367 | * | 9/1991 | ........... F03D/11/02 |
| WO | WO 01/29413 | * | 10/1999 | ............ F03D/1/00 |

* cited by examiner

Primary Examiner—Nicholas Ponomarenko
Assistant Examiner—Heba Elakssabgi
(74) Attorney, Agent, or Firm—Dennis G. LaPointe; Mason Law, PA

(57) ABSTRACT

Improvements to wind turbines for electrical power generation, incorporating a blade (4) rotor for harnessing the action of the wind, which consists of a hub (3) prolonged at the rear with an extension (7) that constitutes the assembly shaft for the rotating action with respect to the body (1) of the wind turbine, with the hub (3) and the aforementioned extension (7) forming the shaft constituting a single manufactured piece, with regard to which the blades (4) are arranged in a yaw rotary assembly that is operated by means of respective hydraulic cylinders (20).

6 Claims, 5 Drawing Sheets

WIND TURBINES FOR ELECTRICAL POWER GENERATION

BACKGROUND INFORMATION

The present invention refers to wind turbines used to produce electrical energy by harnessing the force of the wind, with provision of an anticipated structural arrangement that improves the features of construction, erection and operation of the wind turbine.

The environmentally-friendly nature that defines wind energy, in addition to the progress that has been achieved in technological terms, leads wind energy to be increasingly used as a drive means for producing electricity, through the use of the so-called wind turbines.

Said wind turbines generally consist of a blade rotor, by means of which the power of the wind is used to effect a rotary action that operates a generator for producing electricity.

In wind turbines currently in use, the blade rotor consists of a core or hub, with respect to which the blades for harnessing the action of the wind are radially mounted; axially attached to said hub there is a shaft upon which the rotor of the generator producing the electricity is mounted, in a manner that said shaft is fitted axially in rotary assembly with respect to the body of the wind turbine, in which the stator of the electric generator is mounted in a fixed position, whilst the rotary arrangement of the shaft is established by means of a coupling using bearings.

This structural design of the wind turbines implies considerable difficulties in the erection, given the components of the installation and the couplings that have to be effected between them, rendering them susceptible to noise, vibration and resonance during operation.

The blades harnessing the action of the wind rotate on the hub, in order to yaw the positioning of the same in response to the power of the wind, using for this electric drive motors associated with the individual blades; this requires an expensive assembly and, furthermore, a possible electrical power supply failure renders inoperable the yaw rotation of the blades, making it necessary to provide emergency batteries or accumulators, given that said rotary drive for the yaw of the blades must always be operational to avoid deterioration in the event of strong gusts of wind and to exert a suitable control that will permit achieving the best performance from the wind turbine at each moment.

SUMMARY OF THE INVENTION

In accordance with the invention, a wind turbine is proposed that is fitted with a number of improvements that permit is significantly enhanced design with regard to those features described above.

The wind turbine covered by this invention consists of a blade rotor that comprises a hub that is prolonged at the rear with an extension that constitutes the shaft upon which the rotor of the electric generator is mounted, in a manner whereby the shaft and the hub structurally conform a single piece, to which the blades for harnessing the action of the wind are attached, in addition to the assembly of the rotary coupling with regard to the body of the wind turbine.

The single piece of the shaft-hub is closed at the rear by means of a cover that is fitted as an integral part of the same, upon which and axially attached to the outer part there is a boss, with respect to which the manifold of the electric generator is mounted, in addition to a coupling bearing on a mount attached to the casing of the body of the wind turbine; a bearing which is coupled directly to the casing of the body of the wind turbine is attached on the forward area of the part of the single piece that constitutes the shaft.

This thus provides a simple construction structure, as the hub unit of the blade rotor and the shaft of the rotary assembly only require the manufacture of a single piece, which is contemplated in boiler steel, with no need to perform any kind of coupling assembly between said parts; furthermore, the single piece unit of this assembly facilitates the erection of the wind turbine.

It is contemplated that the assembly will be performed by means of elastomeric runners between the part that constitutes the shaft and the casing of the body of the wind turbine, whereby a rotary assembly is achieved that absorbs vibrations and avoids resonance.

With regard to the assembly of the blades for harnessing the action of the wind, which are fitted for rotation on the hub, hydraulic drive-cylinders are provided, by means of which each blade can be rotated individually, in order to adjust the positioning of the same in response to the power of the wind.

This means a very straightforward installation, given that no motors are used, nor the corresponding necessary transmission, for said yaw function of the blades of the wind turbine; rather, said function is addressed using hydraulic cylinders, which are much easier to assemble and furthermore permit greater accuracy in the yaw movement of the blades, as no coupling transmissions are required.

In addition, this arrangement of hydraulic cylinders removes the need for providing emergency electrical accumulators to cater for the possibility of failure in the electrical power supply, with only hydraulic accumulators required, which are of much lower cost and more reliable.

It is necessary to provide a small battery for operating the servovalve for each cylinder; but this battery is very small, simple and of minimal cost compared to the electrical accumulators required for feeding the electric motors that operate the blades in traditional designs, in the event of a failure in the power supply.

In view of all the above, the aforementioned wind turbine covered by the invention certainly provides highly advantageous characteristics, standing apart with distinct features with regard to those wind turbines that are currently known.

DETAILED DESCRIPTION OF THE INVENTION

Figure 1:
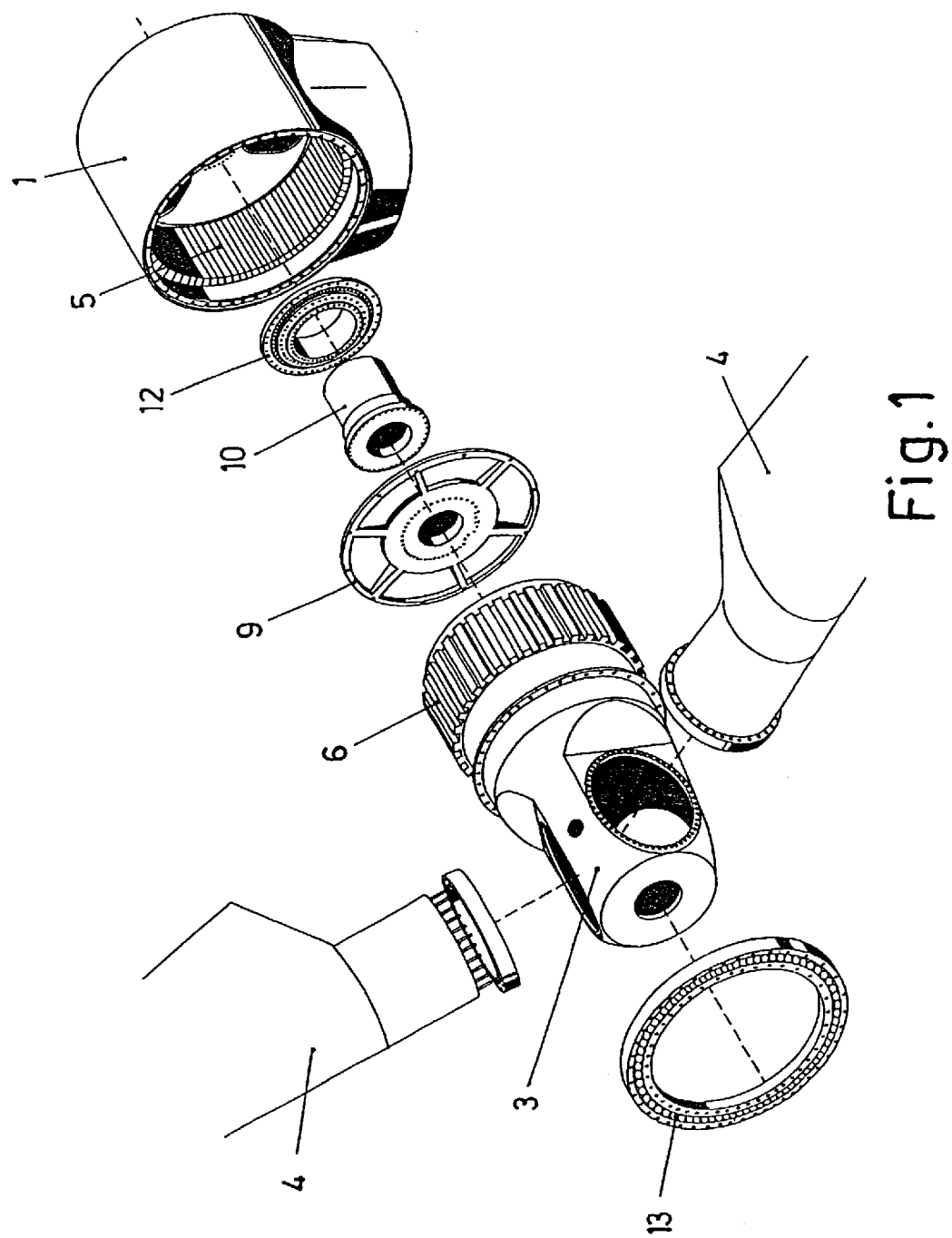
FIG. 1 provides a perspective drawing of the shaft-hub of the wind turbine in question, in an exploded view of the assembly in relation to the body of the wind turbine, with two blades partially displayed facing their respective assembly couplings.

The invention refers to a wind turbine used for producing electrical energy through the power of the wind, consisting of a body (1) in which the operational assembly in installed, which is mounted on a supporting mast or tower (2) with the possibility for rotary yaw for alignment with the wind.

A wind rotor is mounted in rotary assembly with regard to the body (1), consisting of a hub (3) upon which various blades (4) are attached for the purpose of harnessing the action of the wind, so that by means of the aforementioned blades (4) the wind rotates the hub (3), which transmits the rotary action to produce electricity by means of a generator that is installed in the body (1).

The electric generator consists of a stator (5) that is mounted in a fixed position inside the casing of the body (1) and a free-rotating rotor (6) mounted within said stator (5), with said rotor (6) mounted on a shaft (7) that is attached to the hub (3) upon which the blades (40) are attached. According to the invention, the hub (3) is prolonged in the rear by an extension that constitutes the shaft (7), whereby both elements are constructed as a single piece, which is contemplated to be of boiler steel, which facilitates is manufacture and assembly, as there are no joint couplings between these two components.

That single piece assembly of the hub (3) and the shaft (7) provides a large inner space, which may be accessed by operators (8) for performing those operations that may be required inside, with incorporation on the rear part of a cover (9), which is an integral part of the same and joined to the end of the shaft (7), providing reinforcement for the same, whilst upon said cover (9) a boss (10) is mounted by axial attachment to the outer part, with respect to which the manifold (11) of the electric generator is mounted.

Figure 2:
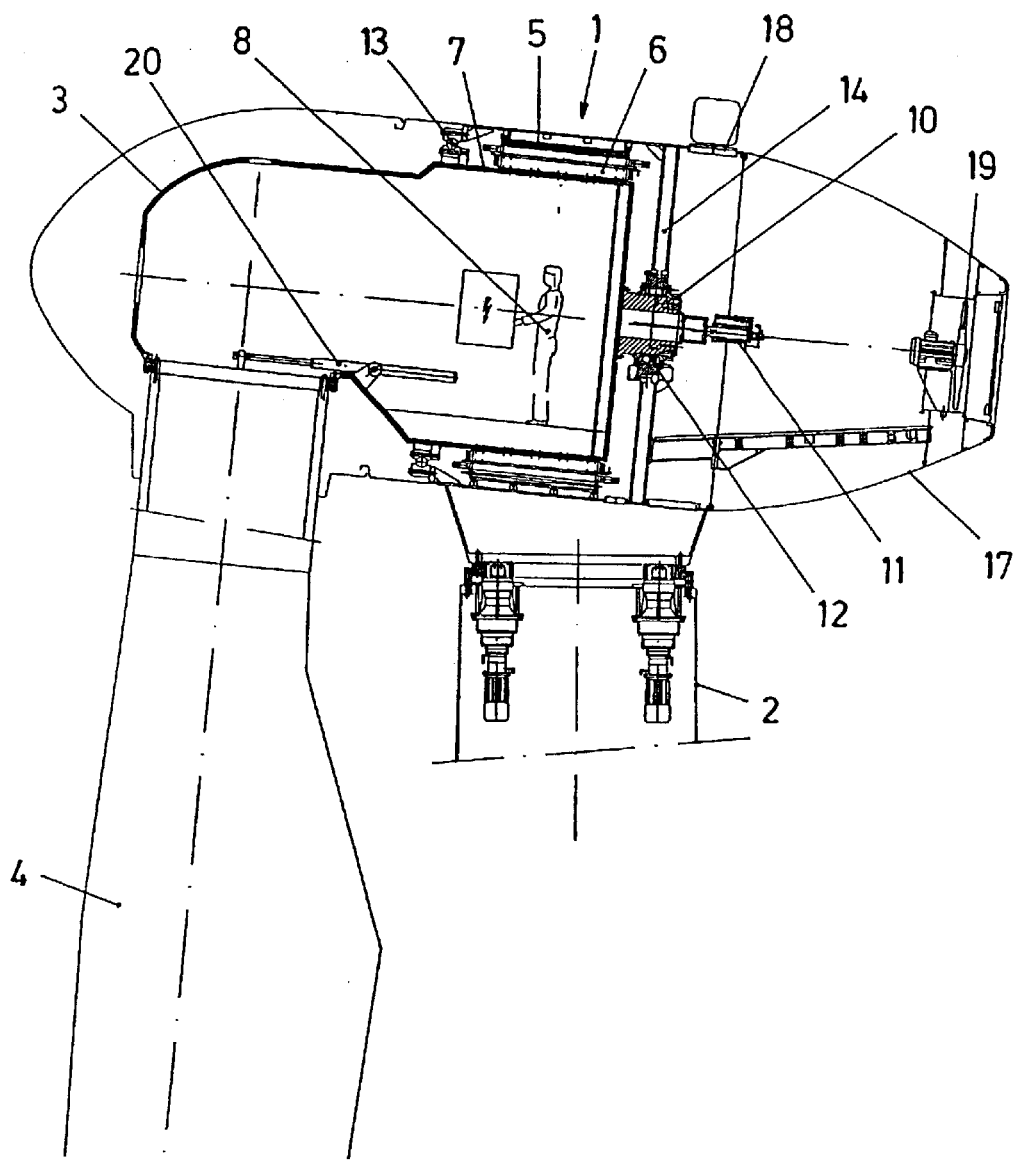
FIG. 2 is a lateral cross-section view of the body of the assembled wind turbine.
Figure 4:
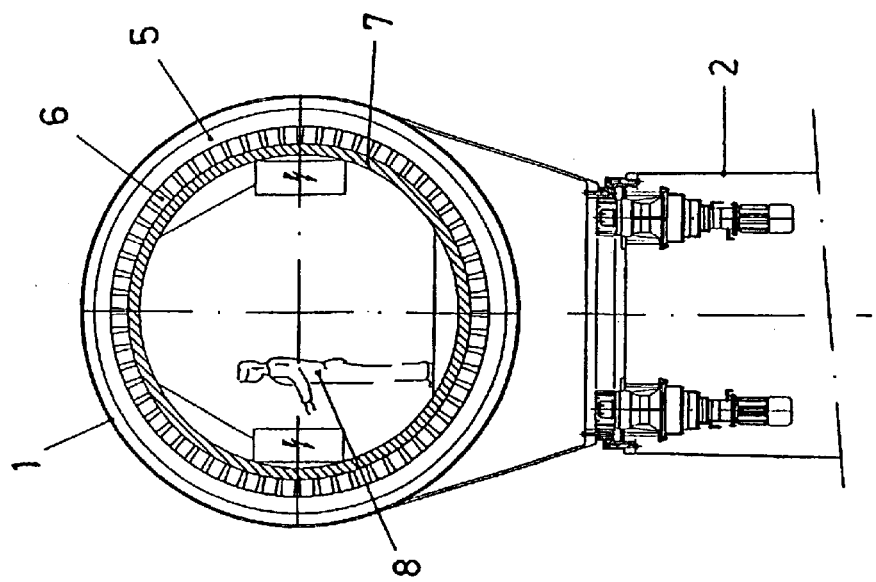
FIG. 4 is a frontal cross-section view of the body of the wind turbine.
Figure 3:
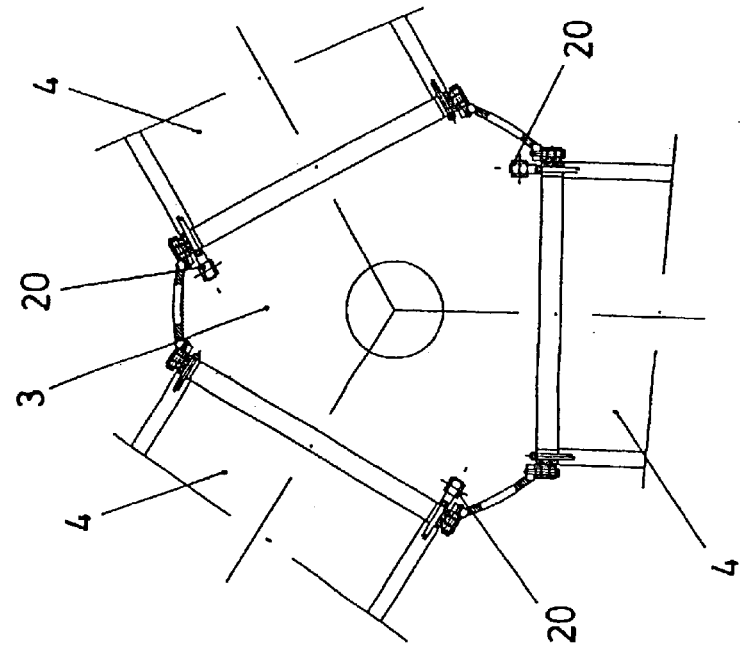
FIG. 3 is a frontal cross-section view of the blade rotor of the wind turbine.

Said unit is assembled to the body (1) of the wind turbine (see FIG. 2) by means of two bearings (12 and 13), one of which (12) is mounted on the boss (10) and by means of this, attachment is made onto a support (14) that is joined to the casing of the body (1); whilst the other bearing (13) is mounted on the actual shaft (7) on its forward part, between said shaft (7) and the casing of the body (1).

Figure 5:
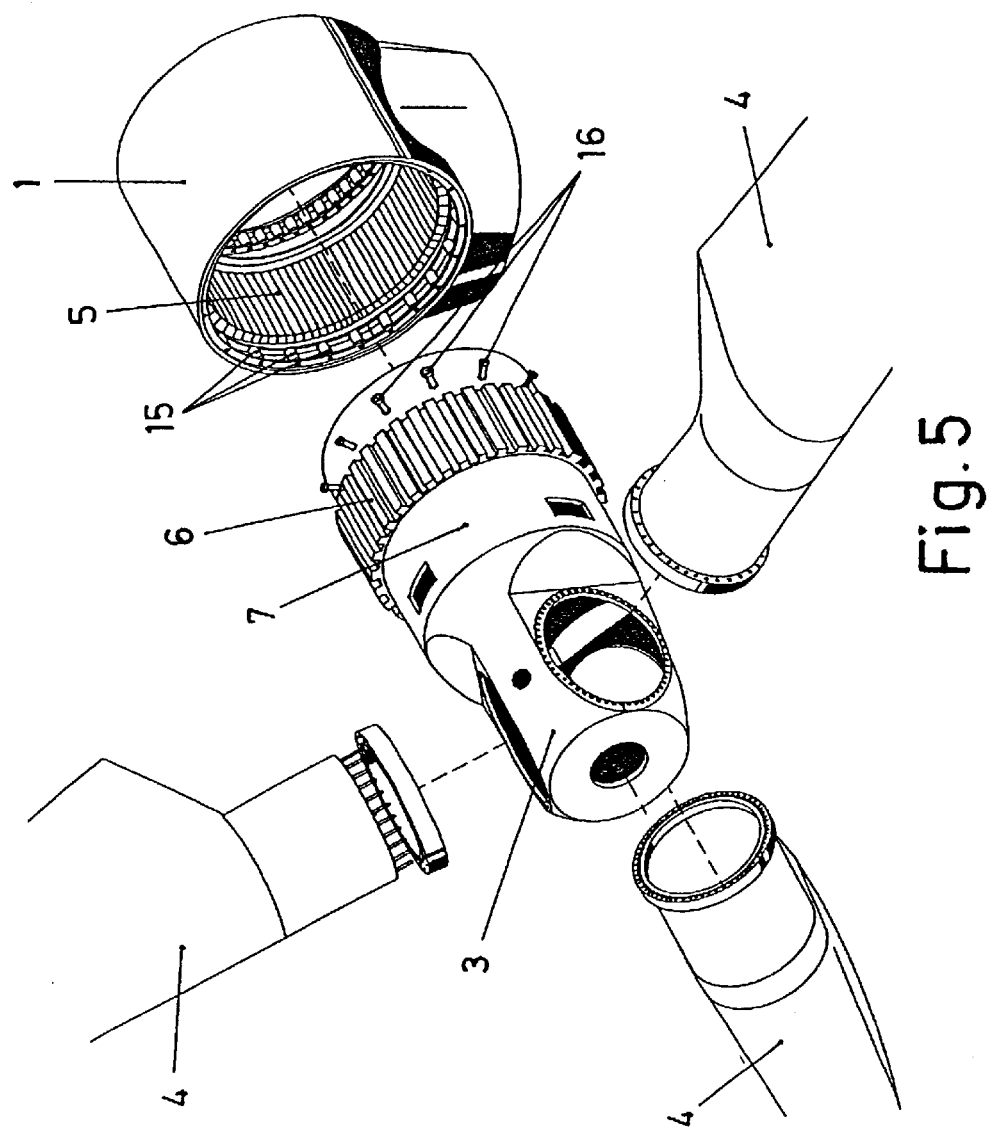
FIG. 5 is an exploded view of the wind turbine body and blade rotor assembly, in a embodiment for the rotary assembly by means of elastomeric runners.
Figure 6:
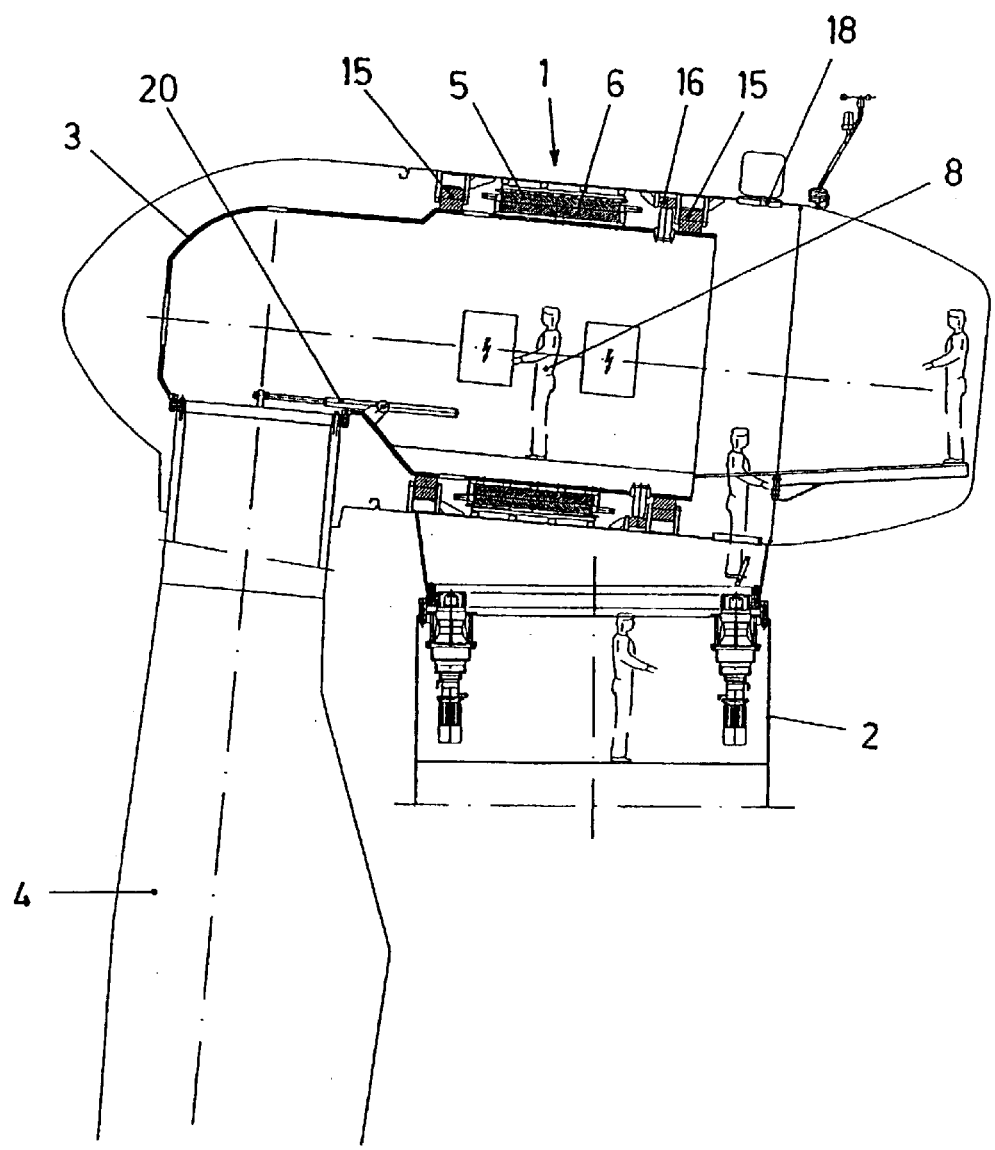
FIG. 6 is a lateral cross-section view of the mounted assembly of the wind turbine, according to the embodiment of the previous figure.

Under the same concept of integration of the hub (3) and the shaft (7) within a single piece assembly, which is the essence of the invention, it is contemplated to mount the rotary assembly with regard to the body (1) of the wind turbine by means of elastomeric runners (FIGS. 5 and 6), in other words, by means of elastomeric runners (15) mounted inside the casing of body (1), which provide roller support on the external face of the shaft (7) and other elastomeric runners that support on rolling tracks in a perpendicular arrangement to the former, determining between the assembly of the rollers (15 and 16) a radial and axial fastening of the assembly, with free rotation and with a set of rollers that absorb vibrations.

On the rear casing (17) for closure of the body (1), an access window (18) is anticipated, whilst on the rear end a fan (19) may be mounted for cooling purposes.

The blades (4) are attached in a rotary assembly on the hub (3), for the yaw of the same to the most suitable position, according to the power of the wind, for the purpose of achieving the optimum performance of the wind turbine in electrical power production and to avoid, when appropriate, deterioration caused by excessive stress in the case of extreme gusts of wind.

To operate the drive for the yaw rotation of the blades (4) accordingly, attachment is made in relation to them, pursuant to this invention, of respective hydraulic drive cylinders (20), which are fitted inside the hub (3), by means of which, in relation to a corresponding hydraulic feed supply, the rotary operation of blades (4) is performed, which is extremely accurate, as it acts directly on the blades (4), without intermediate transmissions, with provision of separate hydraulic accumulators for the operation of each one of the blades (4), whilst in order to ensure emergency operation whenever there is a failure in the power supply, regarding the servovalves for the control of the hydraulic cylinders (20), small batteries are provided that are of low cost and simple installation.

What is claimed is:

1. Improvements to wind turbines for electrical power production, of those consisting of a blade (4) rotor for harnessing the action of the wind, said rotor being mounted in a rotary arrangement with respect to the body (1) of the wind turbine in which inclusion is made of an electric generator driven by the rotary action of the aforementioned blade rotor, characterised in that the rotor bearing the blades (4) comprises a hub (3) that is prolonged at its rear with an extension (7) that constitutes an assembly shaft with respect to the body (1) of the wind turbine, with the aforementioned hub (3) and the shaft (7) forming a single manufactured piece assembly.

2. Improvements to wind turbines for electrical power production, all in accordance with claim 1, characterised in that the single manufactured piece assembly of the hub (3) and the shaft (7) configure a large space inside, with the rear attachment of a cover (9) that is an integral part of the end of the shaft (7) and upon which, and in axial attachment on the outer part, a boss (10) is mounted, with respect to which the manifold of the electric generator is mounted.

3. Improvements to wind turbines for electrical power production, all in accordance with claim 2, characterised in that the rotary assembly of the single manufactured piece assembly of the hub (3) and the shaft (7) is attach to the body (1) of the wind turbine by means of a back-end bearing (12) that is fitted between the boss (10) of the cover (9) and a support (14) attached to the casing of the body (1), and to a forward part between the actual shaft (7) and the casing of the body (1) by means of a front-end bearing (13).

4. Improvements to wind turbines for electrical power production, all in accordance with claim 1, characterised in that the rotary assembly of the single manufactured piece assembly of the hub (3) and the shaft (7) is attached to the body (1) of the wind turbine by means of a back-end bearing (12) that is fitted between the boss (10) of the cover (9) and a support (14) attached to the casing of the body (1), and to a forward part between the actual shaft (7) and the casing of the body (1) by means of a front-end bearing (13).

5. Improvements to wind turbines for electrical power production, all in accordance with claim 1, characterised in that the assembly of the single manufactured piece assembly of the hub (3) and the shaft (7), with respect to the body (1) of the wind turbine, is attached by means of elastomeric runners (15 and 16), which are mounted between the shaft (7) and the casing of the body (1), providing roller support in the radial direction and in the axial direction of the assembly.

6. Improvements to wind turbines for electrical power production, all in accordance with claim 1, characterised in that the blades (4) are mounted in a rotary assembly on the hub (3), with attachment made in relation to them of respective separate hydraulic drive cylinders (20) by means of which the blades (4) turn to adjust their yaw in response to the strength of the wind.

* * * * *

UNITED STATES PATENT AND TRADEMARK OFFICE
CERTIFICATE OF CORRECTION

PATENT NO. : 6,759,758 B2
DATED : July 6, 2004
INVENTOR(S) : Manuel Torres Martinez Page 1 of 1

It is certified that error appears in the above-identified patent and that said Letters Patent is hereby corrected as shown below:

Title page,
Item [56], References Cited FOREIGN PATENT DOCUMENTS, replace
"EP 1 819 830 A1 6/2003" with -- EP 1 319 830 A1 6/2003 --; and replace
"ES 2185504 3/2001…..F03D/11/04" with -- ES 2185504 4/2003…..F03D/11/04 --.
Delete "ES 2185504 4/2003".

Signed and Sealed this

Twenty-third Day of November, 2004

JON W. DUDAS
*Director of the United States Patent and Trademark Office*